Feb. 5, 1963   F. G. FREEMAN   3,076,671
QUICK CONNECT COUPLING
Filed Feb. 1, 1960

Inventor
F. G. Freeman
By Gilbert, Downing & Seebold
Attys.

3,076,671
QUICK CONNECT COUPLING
Frank George Freeman, Solihull, England, assignor to Joseph Lucas (Industries) Limited, Birmingham, England
Filed Feb. 1, 1960, Ser. No. 5,854
Claims priority, application Great Britain Feb. 5, 1959
1 Claim. (Cl. 285—277)

The object of this invention is to provide a pipe coupling in a convenient form, the coupling being of particular advantage where the pipes are to be subjected to high fluid pressure.

A pipe coupling according to the invention comprises in combination a pair of complementary tubular parts adapted for connection to the pipes to be connected, one of said parts having an end portion adapted to fit within the adjacent end of the other part a pair of spring-loaded valve closure member co-operating with seatings formed in the two parts respectively, said closure members being adapted to be removed from their respective seatings automatically on interengagement of the parts, a sealing member which is located between the overlapping ends of said parts when the latter are interengaged, a guide fixed relative to said one part which it surrounds in spaced relationship, a first spring-loaded sleeve axially slidable within the guide, a second spring-loaded sleeve surrounding the guide and axially movable relative thereto, and radially movable locking members located within holes in the first sleeve, said members being adapted to co-act with an external shoulder on said other part and an internal projection on the second sleeve to retain the parts in engagement.

Figure 1:
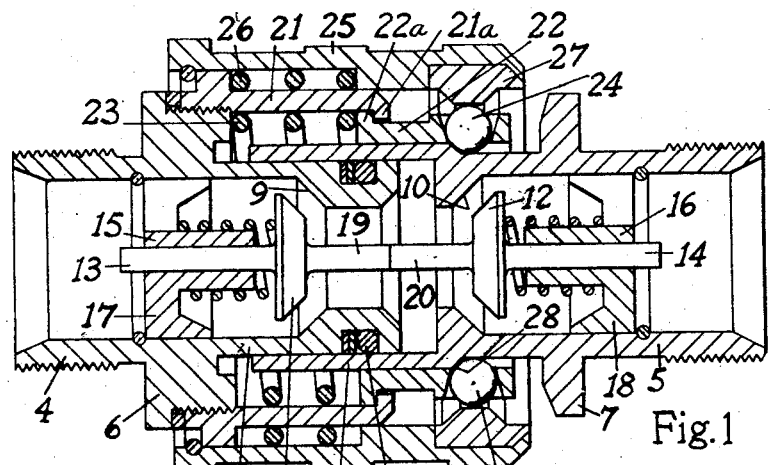
Figure 2:
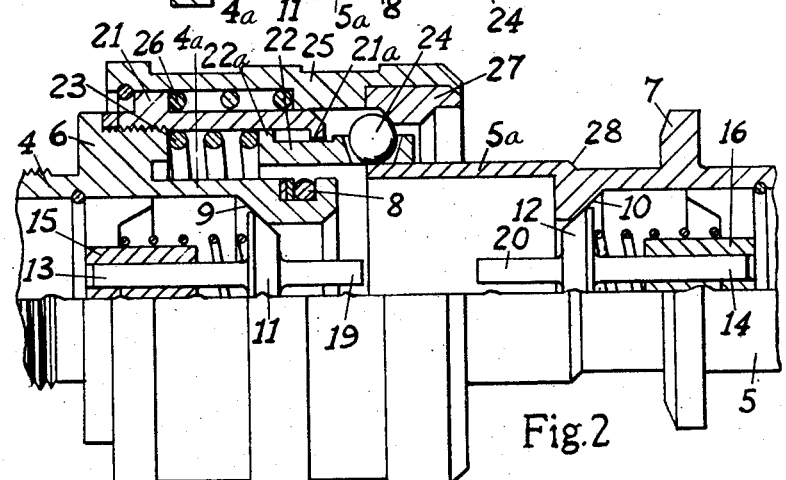
Figure 3:
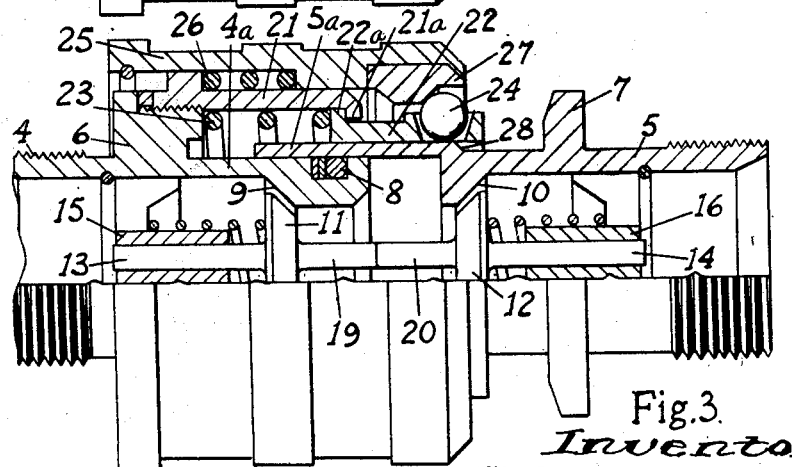

In the accompanying drawings FIGURE 1 is a sectional side view illustrating one example of the invention, whilst FIGURES 2 and 3 respectively are part sectional side views illustrating two alternative positions of the various parts.

Referring to the drawings there is provided a pair of complementary tubular parts 4, 5. The parts 4, 5 respectively incorporate peripheral flanges 6, 7 or other circumferential projections intermediate their ends, and at one side of these projections each part is externally screw-threaded or otherwise adapted for attachment to one of the pipes to be coupled. The opposite end 4a of the part 4 is adapted to fit within the opposite end 5a of the part 5. Also, in the periphery of the end 4a of the part 4 is a circumferential groove accommodating a portion of a rubber or other resilent sealing ring 8 which will be compressed when the parts 4, 5 are interengaged and thereby form a fluid tight seal.

Within the parts 4, 5 respectively are formed seatings 9, 10 with which co-operate the heads 11, 12 of a pair of associated spring-loaded poppet valves, the stems 13, 14 of the valves being slidably mounted respectively in guides 15, 16 supported axially within the parts 4, 5 by means of integral radial arms 17, 18. Moreover, from the center of the heads 11, 12 respectively extend pins 19, 20 which on interengagement of the parts 4, 5 contact one another and thereby open both valves against the action of their spring-loadings.

Secured to the flange 6 is one end of a guide sleeve 21 which extends in radially spaced and concentric relationship around the end 4a of the part 4. Slidable within the sleeve 21 is a sleeve 22 which is urged away from the flange 6 by means of a coiled compression spring 23 interposed between the flange 6 and the inner end of the sleeve 22. To prevent disengagement of the sleeve 22 from the sleeve 21, the latter has an inturned lip 21a for co-operation with a shallow external flange 22a at the inner end of the sleeve 22.

At a position beyond the sleeve 21 there are formed in the sleeve 22 a plurality of angularly spaced holes in which are accommodated radially movable locking members in the form of balls 24. The holes in the sleeve 22 are inwardly tapered so that the balls 24 cannot fall from the inner sides of the holes but can protrude therefrom.

Slidable on the outer periphery of the sleeve 21 is a sleeve 25 which is spring-loaded away from the flange 6 by means of a coiled compression spring 26 interposed between a shoulder on the exterior of the sleeve 21 and a shoulder in the interior of the sleeve 25. Secured within the outer end of the sleeve 25 is an annular cam ring 27 which is shaped to project inwardly at a position normally in register with the balls 24.

The end 5a of the part 5 is of slightly larger diameter than the portion of the part 5 on which the flange 7 is formed, so as to define an inclined shoulder 28 with which the balls 24 are adapted to co-operate in retaining the parts 4, 5 in engagement.

When engaging the parts 4, 5 of the coupling the part 5a first contacts the balls 24, thereby moving the sleeve 22 inwardly against its spring 23. When the balls 24 are moved to the position shown in FIGURE 2, in which they are out of register with the cam ring 27, they can move radially outwards to allow the interengagement of the parts to the fullest extent. As soon as the shoulder 28 has passed through the cam ring 27, the sleeve 22 is moved outwardly by its spring to engage the balls 24 between the cam ring 27 and the periphery of the part 5. Fluid pressure within the coupling tending to separate the parts 4, 5 will then cause the external shoulder 28 to move into contact with the balls 24. However, since the balls 24 are prevented from radial movement by the cam ring 27 disengagement of the parts 4, 5 is resisted.

When it is required to disengage the parts 4, 5, relative axial movement is imparted to the male part 4 and the sleeve 25 against the action of the spring 26. As a result the cam ring 27 is removed from the balls as shown in FIGURE 3. The balls 24 can then move radially outwards to permit separation of the parts 4, 5.

In a modification, the sleeve 25 is connected to a fixed part and forms the means whereby the part 4 is mounted. In this case a pull exerted on the part 5 first causes the parts 4, 5 to move axially relative to the sleeve 25, until the part 5 is released and withdrawn.

This modification is particularly advantageous in that it will permit separation of the parts 4, 5 with one hand. In other cases two hands will be required to effect the required axial movement between the sleeve 25 and the part 4.

Having thus described my invention what I claim as new and desire to secure by Letters Patent is:

A pipe coupling comprising in combination a pair of main tubular parts provided respectively with first and second end portions which are slidably interengageable with the first end portion fitting within the second end portion, said first end portion having in its outer periphery a circumferential groove which is coverable by said second end portion, a resilient sealing ring which is mounted in said circumferential groove, and which forms a fluid-tight seal between said first and second end portions when the latter are interengaged, a guide sleeve which is secured at one end to the main tubular part provided with said first end portion, and which extends over said first end portion in concentric and radially spaced relationship thereto, an axially slidable second sleeve having an end portion extending into the other end of said guide sleeve, a compression spring situated within said guide sleeve and acting on the adjacent end of said second sleeve, complementary abutments provided respectively on the adjacent ends of said guide sleeve and said second sleeve to serve by contact with each other for preventing withdrawal of said second sleeve from said guide sleeve, a third sleeve surrounding said guide sleeve and having an end portion extending beyond the last mentioned end of said guide sleeve, a second compression spring situated between said third sleeve and guide sleeve and opposing relative axial movement thereof, an annular cam situated within and rigid with said end portion of said third sleeve, and provided with a cylindrical inner periphery, and a plurality of radially movable locking members in the form of balls which are located within holes provided in said second sleeve at positions spaced from said guide sleeve, and which are prevented from moving radially outwards by the cylindrical inner periphery of said annular cam when the coupling is in use, said holes being shaped so that said balls can protrude from, but cannot pass completely through, the inner ends of said holes, and the main tubular part provided with said second end portion having an external diameter less than the external diameter of said second end portion thereby providing a shoulder which serves by contact with portions of said balls protruding from the inner ends of said holes to prevent separation of said main tubular parts until the position of said cam relative to said balls is varied to an appropriate extent by relative axial movement of said third sleeve and the main tubular part to which said guide sleeve is secured.

References Cited in the file of this patent

UNITED STATES PATENTS

| | | |
|---|---|---|
| Re. 23,120 | Earle et al. | June 14, 1949 |
| 2,660,456 | Meddock | Nov. 24, 1953 |
| 2,673,750 | Scheiwer | Mar. 30, 1954 |
| 2,709,093 | Zeeb | May 24, 1955 |
| 2,860,893 | Clark | Nov. 18, 1958 |
| 3,032,359 | Cator | May 1, 1962 |

FOREIGN PATENTS

| | | |
|---|---|---|
| 723,281 | Great Britain | Feb. 2, 1955 |